(12) United States Patent
Schalk

(10) Patent No.: US 8,706,405 B2
(45) Date of Patent: *Apr. 22, 2014

(54) SYSTEMS AND METHODS FOR OFF-BOARD VOICE-AUTOMATED VEHICLE NAVIGATION

(71) Applicant: Agero Connected Services, Inc., Irving, TX (US)

(72) Inventor: Thomas Barton Schalk, Plano, TX (US)

(73) Assignee: Agero Connected Services, Inc, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,490

(22) Filed: Jun. 4, 2013

(65) Prior Publication Data

US 2013/0268269 A1    Oct. 10, 2013

Related U.S. Application Data

(63) Continuation of application No. 11/029,971, filed on Jan. 5, 2005, now Pat. No. 7,373,248, and a continuation of application No. 12/057,984, filed on Mar. 28, 2008, now Pat. No. 7,634,357, and a continuation of application No. 12/636,327, filed on Dec. 11, 2009, now Pat. No. 8,478,520, and a continuation of application No. 13/901,961, filed on May 24, 2013, and a continuation of application No. 13/908,421, filed on Jun. 3, 2013.

(51) Int. Cl.
| | |
|---|---|
| *G06F 17/00* | (2006.01) |
| *G06F 19/00* | (2011.01) |
| *G08G 1/123* | (2006.01) |
| *G01C 21/34* | (2006.01) |

(52) U.S. Cl.
USPC ........... 701/418; 701/420; 701/427; 701/443; 340/995.12; 340/995.16; 340/995.23

(58) Field of Classification Search
USPC ......... 701/400, 408, 409, 410, 418, 419, 420, 701/427, 443; 340/988, 989, 990, 993, 340/995.12, 995.16, 995.24, 996
See application file for complete search history.

(56) References Cited

U.S. PATENT DOCUMENTS 6,351,698 B1    2/2002 Kubota
(Continued)

FOREIGN PATENT DOCUMENTS

EP    1 341 363    9/2003
(Continued)

*Primary Examiner* — Thomas Tarcza
*Assistant Examiner* — Edward Pipala
(74) *Attorney, Agent, or Firm* — Mayback & Hoffman, PA.; Gregory L. Mayback; Rebecca A. Tie

(57) ABSTRACT

A system for providing navigational information comprises a mobile system processing and transmitting via a wireless link a continuous voice stream spoken by a user of the mobile system, the continuous voice stream including a complete destination address and a data center processing the continuous voice stream received via the wireless link into voice navigational information. The data center performs automated voice recognition processing on the voice navigational information to recognize destination components of the complete destination address, confirms the recognized destination components through interactive speech exchanges with the mobile system user via the wireless link and the mobile system, selectively allows human data center operator intervention to assist in identifying the selected recognized destination components having a recognition confidence below a selected threshold value, and downloads the complete destination address for transmission to the mobile system derived from the confirmed recognized destination components.

20 Claims, 8 Drawing Sheets

(56) References Cited

U.S. PATENT DOCUMENTS

| | | |
|---|---|---|
| 6,381,535 B1 | 4/2002 | Durocher |
| 6,405,123 B1 | 6/2002 | Rennard |
| 6,999,874 B2 | 2/2006 | Seto |
| 2002/0156570 A1 | 10/2002 | Ohtsuji |
| 2003/0088359 A1 | 5/2003 | Park |
| 2003/0229444 A1 | 12/2003 | Bullock |

FOREIGN PATENT DOCUMENTS

| | | |
|---|---|---|
| FR | 2 827 695 | 1/2003 |
| WO | 02 48650 | 6/2002 |
| WO | 03 079310 | 9/2003 |

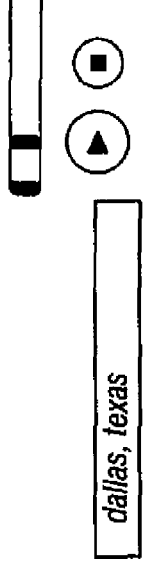
FIG. 3
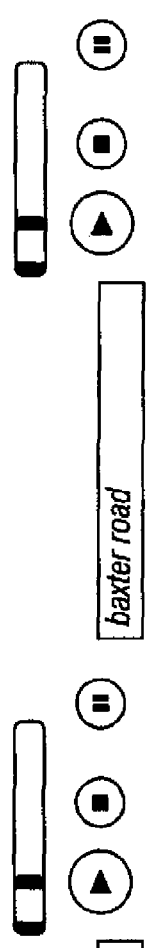
FIG. 4
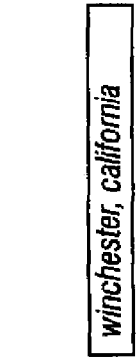

SYSTEMS AND METHODS FOR OFF-BOARD VOICE-AUTOMATED VEHICLE NAVIGATION

CROSS REFERENCE TO RELATED APPLICATIONS

This application is a continuation of:
U.S. patent application Ser. No. 13/908,421, filed on Jun. 3, 2013;
U.S. patent application Ser. No. 13/901,961, filed on May 24, 2013;
U.S. patent application Ser. No. 12/636,327, filed on Dec. 11, 2009, now U.S. Pat. No. 8,478,520;
U.S. patent application Ser. No. 12/057,984, filed on Mar. 28, 2008, now U.S. Pat. No. 7,634,357; and
U.S. patent application Ser. No. 11/029,971, filed on Jan. 5, 2005, now U.S. Pat. No. 7,373,248 (which application claims priority of U.S. Provisional Patent Application Ser. No. 60/608,850, filed on Sep. 10, 2004),
the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The present invention relates in general to vehicle navigation techniques, and in particular, to systems and methods for off-board voice-automated vehicle navigation

BACKGROUND OF THE INVENTION

Automotive navigation systems have been available for a number of years and are designed to guide vehicle operators to a specified destination. A major shortcoming of conventional navigation systems relates to the methods of entering target destinations. It is well known that driver distraction occurs when a vehicle operator interacts with a keypad or a touch screen while driving. In fact, first time users typically become frustrated with the human factors and associated learning necessary to enter target destinations manually. Furthermore, existing systems allow users to enter destination while driving, which has been shown to cause driver distraction. Entering an address or point of interest (POI) by using manual methods typically requires time and concentration on the vehicle operator's part, and in particular, one cannot watch the road or drive safely. There is ongoing pending litigation that relates to driver distraction and the use of navigation systems while driving.

For most in-vehicle navigation systems, there are sequential steps that occur during usage. The process begins with user interaction where the navigation system first determines the starting location, usually from GPS information. The target destination is typically entered as an address, a street intersection, or a point of interest. It would be a substantial advancement in the art to provide a menu-driven, automatic voice recognition system located at a remote data center that would recognize spoken target destinations while simultaneously utilizing GPS information transmitted from the vehicle over a wireless link to the remote data center. It would also be a significant advancement to provide a voice user interface that is designed to minimize vehicle operator interaction time and/or data center operator interaction time.

Finally, it would be a significant advancement if target destinations could be determined with high reliability and efficiency by utilizing the combination of GPS information, voice automation technology, operator assistance, and user assistance for confirming that the specified destination is correct. When necessary, the operator would be involved in determining the target destination that has been spoken, and the vehicle operator (the user) would confirm that the spoken destination is correct before the data center operator becomes involved. An automatic speech recognizer, high-quality text-to-speech, and GPS information each play a role in the overall process of determining a target destination.

SUMMARY OF THE INVENTION

Accordingly, the present invention is directed to a system and a method of delivering, or downloading, navigation information from a remote data center database over a wireless link to a vehicle. The information delivered would be in response to voice-recognized target destinations spoken by the operator of the vehicle. The voice recognition system would be located at the remote data center. The information delivered, or downloaded, could be the target destination POI, street intersection, or address. The destination would be determined through a voice user interface whereby four components are involved in the automation process, including: voice technology, vehicle GPS information, the data center operator, and the vehicle operator. The information delivered, or downloaded, could also be the route information for the target destination POI, or address, determined through the voice user interface.

The primary advantages of the remote data center are flexibility and cost-effectiveness. Accurate, up-to-date data can be accessed and the amount of data can be very large because of memory technology. Because the automation platform is off-board, the application can easily be modified without changing any in-vehicle hardware or software. Such flexibility allows for user personalization and application bundling, in which a number of different applications are accessible through a voice main menu. In terms of cost, server-based voice recognition resources can be shared across a large spectrum of different vehicles. For example, 48 channels of server-based voice recognition can accommodate over 1,000 vehicles simultaneously.

The voice technology requirements for the invention include highly intelligible text-to-speech, speech recognition, n-best search results and associated recognition confidence levels. The term "n-best search results" refers to a common speech recognition output format that rank orders the recognition hypotheses based on probability. The text-to-speech is used to represent what was recognized automatically and can be distinguishable from the vehicle operator's voice. A pronunciation database, also referred to as a phonetic database, is necessary for correct intelligible pronunciations of POIs, cities, states, and street names. For cases in which a recognition result does not have a high confidence score, a recording of what was spoken is played back to the vehicle operator for confirmation that the speech representation, or audio wave file, is correct and recognizable by a human, ultimately the data center operator. For example, if a vehicle operator says a city and state, a street name, and a street number, then the application repeats what was spoken in one of three ways: in a pure computer voice (text-to-speech), a combination of a computer voice and the vehicle operator's voice, or only in the vehicle operator's voice. In the latter case, the data center operator would listen to the speech and determine the address by listening and observing the n-best lists associated with each part of the address. In the former case, the data center operator would not be involved or needed; the process would be full automation. In the hybrid case, the data center operator would listen to part of what was spoken and determine the address by listening and observing the n-best lists associated with the part of the address not automatically recognized. It would be typical for the operator to listen and simply click on the n-best selection that matches the address component in question. Typing the address component would be required if the n-best list does not contain the correct address component. When involved, the data center operator may choose to listen to any component of the address. A similar strategy is used for determining a spoken POI.

For POI entry, the voice user interface can be designed to capture a POI category (e.g., restaurant or ATM) and determine whether the nearest location is desired. If so, the spoken destination entry task is completed after confirmation with a "yes" response. If the nearest location is not desired, a "no" response is spoken and the vehicle operator is prompted to say the name of the POI. Similarly, if the category is not recognized, it is recorded and passed on to the data center operator in addition to the POI name, also recorded if not recognized, subsequent to vehicle operator confirmation that the recording are correct. For POI determination, GPS may be used to constrain the active POI grammar based on a specified radius relative to vehicle location.

If a vehicle operator says a POI category and a POI name, then the application repeats what was spoken in one of three ways: in a pure computer voice (text-to-speech), a combination of a computer voice and the vehicle operator's voice, or just in the vehicle operator's voice only. In the latter case, the data center operator would listen to all of what was spoken and determine the POI by listening and observing the n-best lists associated with the POI category and name. In the former case, the operator would not be involved or needed; the process would be full automation. In the hybrid case, the data center operator would listen to part of what was spoken and determine the POI through listening and observing the n-best list associated with either the POI category or name. It would be typical for the operator to listen and simply click on the n-best selection that matches the POI component in question. Typing the POI component would be required if the n-best list does not contain the correct POI component. When involved, the data center operator may choose to listen to any component of the POI.

The invention described is intended to be integrated with an on-board navigation system capable of real-time GPS processing for route delivery. The navigation system is a hybrid solution in the optimized case because routes cannot be delivered as effectively in real-time from a remote data center. When turn-by turn directions are delivered directly from the remote data center, the GPS information specifying vehicle location can lose synchronization with actual vehicle position due to latencies in wireless communication between the vehicle and the remote data center. For example, a system-generated prompt (e.g., instruction to turn) may be experienced too late by the vehicle operator resulting in a route deviation. In summary, the ideal implementation utilizes on-board technology including real-time GPS information to deliver turn-by-turn directions by voice within the vehicle environment.

With the foregoing and other objects in view, there is provided, in accordance with the invention, a method of providing navigational information comprising the steps of receiving at a mobile processing system a continuous voice stream spoken by a user of the mobile processing system, the continuous voice stream including a complete destination address being an entirety of at least one of a target destination point of interest, a street intersection, and an address set including at least a street number and a street name, processing the continuous voice stream into voice navigation information, transmitting the processed voice navigation information via a wireless link to a remote data center, analyzing the processed voice navigation information with a voice recognition system at the remote data center to recognize components of the complete destination address spoken by the mobile system user, generating at the remote data center a list of hypothetical recognized components of the complete destination address listed by confidence levels as calculated for each component of the complete destination address analyzed by the voice recognition system, displaying the list of hypothetical recognized components and confidence levels at the remote data center for selective checking by a human data center operator, selecting a set of hypothetical recognized components based on the confidence levels in the list, confirming the accuracy of the selected set of hypothetical recognized components of the complete destination address via interactive voice exchanges between the mobile system user and the remote data center, and determining a destination from confirmed components of the complete destination address. The address set includes at least a street number, a street name, a city, and a state.

In accordance with another mode of the invention, the accuracy confirming step is carried out by transmitting a computer-generated representation of at least one hypothetical recognized component of the complete destination address to the mobile system user via the wireless link and prompting the mobile system user via the wireless link to aurally confirm the accuracy of the component of the complete destination address.

In accordance with a further mode of the invention, the accuracy confirming step is carried out by determining if a confidence level of a hypothetical recognized component is above a selected threshold and computer generating a representation of the hypothetical recognized component for transmission to the mobile system user when the confidence level is above the selected threshold.

In accordance with an added mode of the invention, the accuracy confirming step is carried out by transmitting at least one recorded hypothetical recognized component of the complete destination address spoken by the mobile system user to the mobile system user via the wireless link and prompting the mobile system user via the wireless link to aurally confirm the accuracy of the hypothetical recognized component of the complete destination address.

In accordance with an additional mode of the invention, the destination determining step is carried out by providing human data center operator assistance using the developed list of hypothetical recognized components and confidence levels to recognize the complete destination address.

In accordance with yet another mode of the invention, the operator assistance providing step is carried out by playing back recorded representations of the complete destination address spoken by the mobile system user to the data center operator for analysis by the data center operator and receiving information from the data center operator identifying the destination.

In accordance with yet a further mode of the invention, the data center operator information receiving step is carried out by entering a choice from the displayed list of hypothetical recognized components from the data center operator.

In accordance with yet an added mode of the invention, the accuracy confirming step is carried out by transmitting aural representations of hypothetical recognized components of the complete destination address to the mobile system user, the hypothetical recognized components of the complete destination address being selected from aural representations of portions of the complete destination from the group consisting address number, street name, city, state, and point of interest.

With the objects of the invention in view, there is also provided a system for providing navigational information comprising a mobile system processing and transmitting via a wireless link a continuous voice stream spoken by a user of the mobile system, the continuous voice stream including a complete destination address and a data center processing the continuous voice stream received via the wireless link into voice navigational information. The data center performs automated voice recognition processing on the voice navigational information to recognize destination components of the complete destination address, confirms the recognized destination components through interactive speech exchanges with the mobile system user via the wireless link and the mobile system, selectively allows human data center operator intervention to assist in identifying the selected recognized destination components having a recognition confidence below a selected threshold value, and downloads the complete destination address for transmission to the mobile system derived from the confirmed recognized destination components.

In accordance with again another feature of the invention, the data center downloads the navigational information in response to position information received from the mobile system via the wireless link.

In accordance with again a further feature of the invention, the data center generates a list of possible destination components corresponding to the continuous voice stream, assigns a confidence score for each of the possible destination components on the list, determines if a possible destination component with a highest confidence score has a confidence score above a threshold, and computer-generates an aural representation of the destination address for transmission to the mobile system for confirmation by the mobile system user if the confidence score is above the threshold.

In accordance with again an added feature of the invention, the data center determines that at least one of the destination components of the continuous voice stream has a recognition confidence value below a threshold and plays back a recording in the voice of the mobile system user of at least the at least one destination component with the recognition confidence value below the threshold to the mobile system user via the mobile system for confirmation.

In accordance with again an additional feature of the invention, the data center further comprises a data center operator facility playing back the destination components for assisting in identifying the complete destination address.

In accordance with still another feature of the invention, the data center presents a list of possible destinations listed by confidence scores to the data center operator for selection as the complete destination address.

In accordance with still a further feature of the invention, the data center allows the data center operator to vary an order of the possible destinations in the list.

In accordance with still an added feature of the invention, the continuous voice stream comprises a spoken request for point of interest information.

In accordance with still an additional feature of the invention, the point of interest information includes information selected from the group consisting of names and categories.

In accordance with another feature of the invention, the destination components of the continuous voice stream comprise location information selected from at least one of the group consisting of information identifying state, city, street name, and address number.

In accordance with a concomitant feature of the invention, the data center further operates to record the continuous voice stream spoken by the user as normalized audio wave fields for subsequent playback.

BRIEF DESCRIPTION OF DRAWINGS

For a more complete understanding of the present invention, and the advantages thereof, reference is now made to the following descriptions taken in conjunction with the accompanying drawings, in which:

FIG. 3 is a conceptual diagram of a representative data center display suitable for implementing data center operator assistance in target destination recognition based on city and state information; and FIGS. 4 and 5 are conceptual diagrams of a representative data center displays suitable for implementing data center operator assistance in target destination recognition based on city, state, and street name information.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1A:
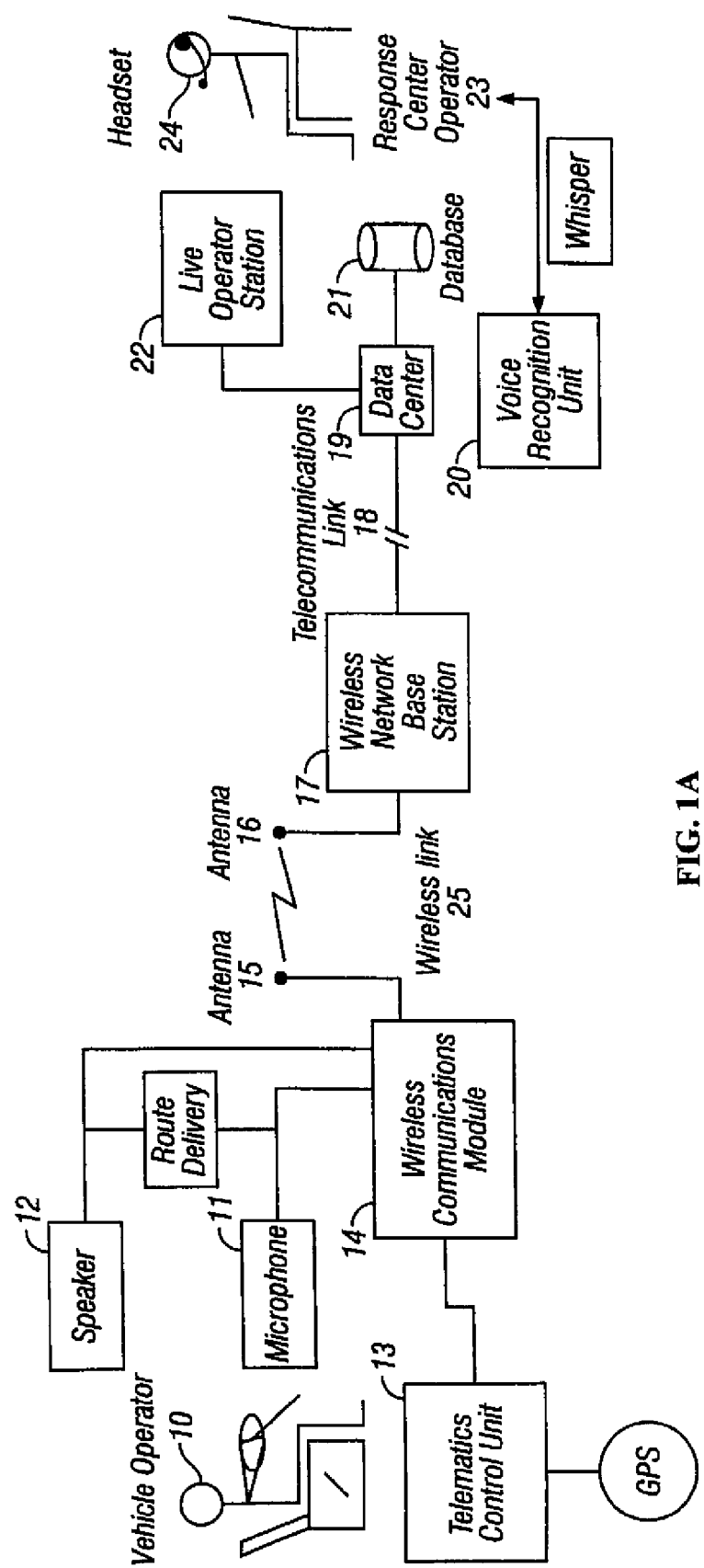
FIG. 1A is a block diagram of an exemplary off-board voice-automated vehicle navigation system embodying the principles of the present invention.
Figure 1B:
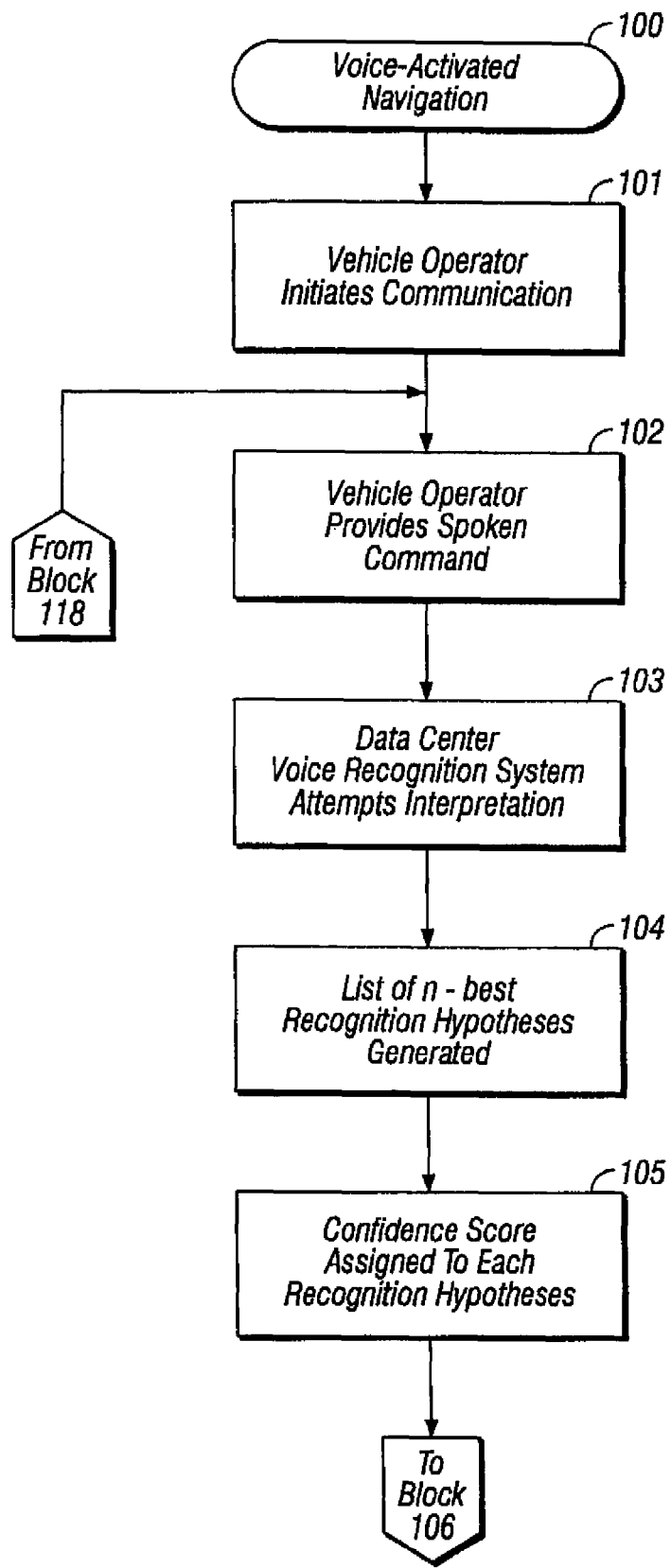
FIG. 1B is a flow chart illustrating representative voice-automated vehicle navigation operations implemented in the system shown in FIG. 1A.
Figure 1B:
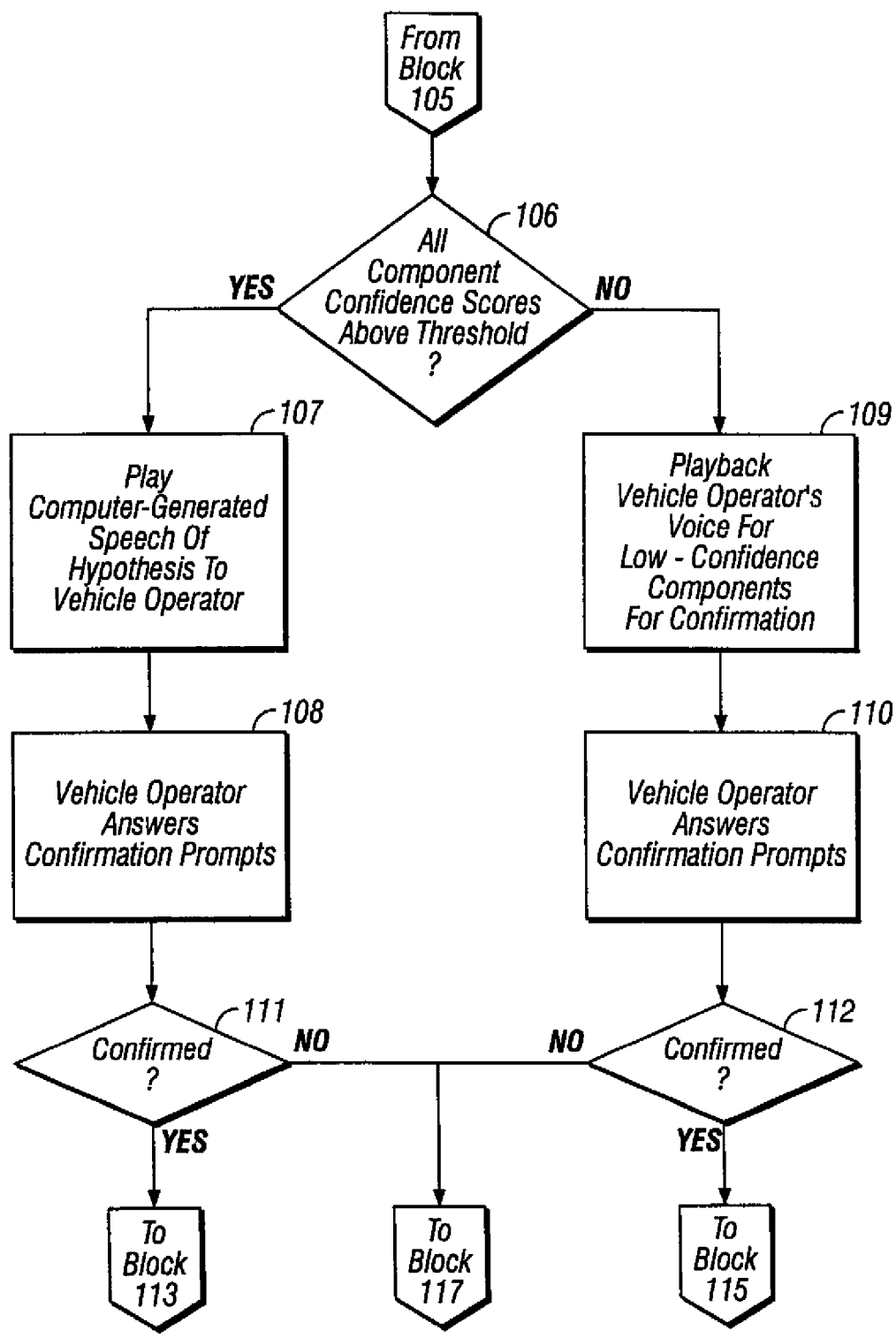
Figure 1B:
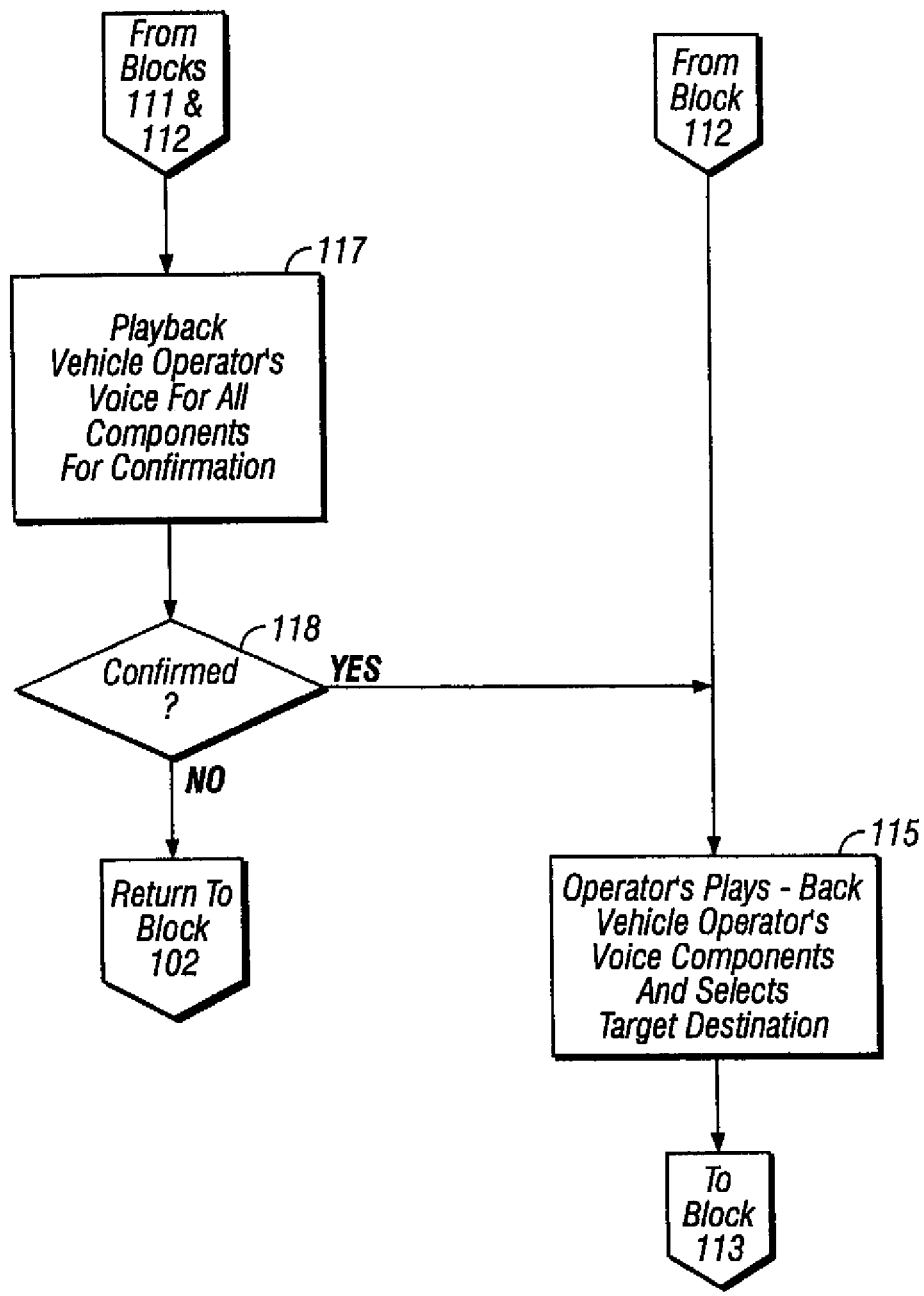
Figure 1B:
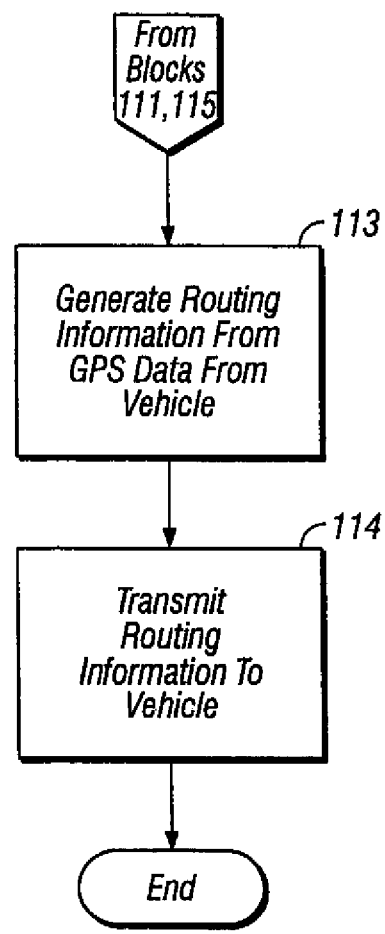

FIG. 1A is a diagram of an exemplary off-board voice-automated navigation system embodying the principles of the present invention. FIG. 1B is a flow chart of a procedure 100 illustrating representative operations of system 100, also embodying the principles of the present invention.

Referring to FIGS. 1A and 1B, when the vehicle operator 10 wishes to enter a target destination in order to receive route guidance, a wireless communications link is initiated to the remote data center 19 at block 101 of procedure 100. The process could be initiated in a number of ways, such as speaking a command in the vehicle or preferably by pressing a button. Communication is established and the vehicle operator 10 speaks commands into the hands-free microphone 11, located in proximity to the vehicle operator 10, at block 102.

The vehicle operator's spoken commands pass over the wireless link 25 through the vehicle mounted wireless communication module 14, through the vehicle mounted wireless antenna 15, through the wireless network's antenna 16 and wireless network base station 17, through one of many telecommunications networks 18, and into the data center 19. From the data center, the voice recognition unit 20 interprets the spoken command(s). The commands include information regarding an address, POI, or street intersection. For an address entry, the city and state may be spoken first.

The voice recognition unit 20 attempts, at block 103 of procedure 100 of FIG. 1 B, to recognize the spoken input and at block 104 creates an n-best list of the top hypotheses where n typically does not exceed five (that is, the recognition unit 20 generates up to five text representations of possible city/ state combinations, each with an associated probability of correct recognition). Each recognition hypothesis is assigned a confidence score (probability), at block 105, that is normalized to 1. If the top choice is assigned a confidence score above a specified threshold, at decision block 106, the spoken input is considered to be recognized, and computer-generated text-to-speech speech audio is played to the vehicle operator 10 (block 107) for confirmation (block 108). If confirmation is positive at block 111, then at blocks 113 and 114 routing information is generated automatically and transmitted to the on-board unit 13.

The speech audio is directed to the vehicle speaker(s) 12 in a hands-free environment. The vehicle operator 10 responds into the hands-free microphone 11 to each system prompt to specify an address, thereby saying a city, state, street name, and street number. The vehicle operator 10 listens to the vehicle speaker(s) 12 to hear the hypothesized address represented by speech audio that is 1) purely computer generated, 2) purely the vehicle operator's 12, or 3) a combination of the two types of speech audio.

The computer-generated voice, utilized at block 107 of procedure 100, only occurs for recognized utterances (top-choice recognition with high confidence). Destination components (city, state, street name and number, POI, etc.) are otherwise individually aurally identified in the vehicle operator's 12 own voice for confirmation when the confidence score falls below a threshold. In particular, if some, or even all, of the destination components spoken by the vehicle operator have confidence scores below the threshold at block 106 of procedure 100, then at least those low confidence components are played-back to the vehicle owner in the vehicle operator's own voice at block 109, for confirmation at block 110. If the vehicle operator confirms the play-back of block 109, then at decision block 112 procedure 100 continues to block 115 for data center operator assistance for determination of the proper destination and generation of the appropriate navigational directions.

On the other hand, when the first attempted confirmation yields a negative result at either block 111 or block 112 of procedure 100, a second play-back is performed at block 117 and a second confirmation from the vehicle owner is attempted at block 118. For the second attempt at confirmation, all destination components are played-back to the vehicle operator. A positive confirmation, at block 118, concludes the user experience for destination entry, after which the operator becomes involved at block 115, if needed. It should be emphasized that if the target destination is spoken and recorded correctly, it does not need to be spoken again by the vehicle operator 12; however, if the vehicle operator still does not confirm the destination components from the second confirmation attempt, then procedure 100, for example, returns to a main menu and the vehicle operator is requested to repeat the desired destination at block 102.

It is critical to emphasize that the vehicle operator 10 confirms that the stored audio wave file is accurate before the response center operator 23 becomes involved. A yes/no confirmation via the voice recognition unit 20 is required for all destinations before the data center operator 23 becomes involved, if needed at all. If the confirmation is negative, another choice on the n-best entry list is selected at decision block 106, for playback at block 109 and another attempt at confirmation is made at block 110.

Figure 2:
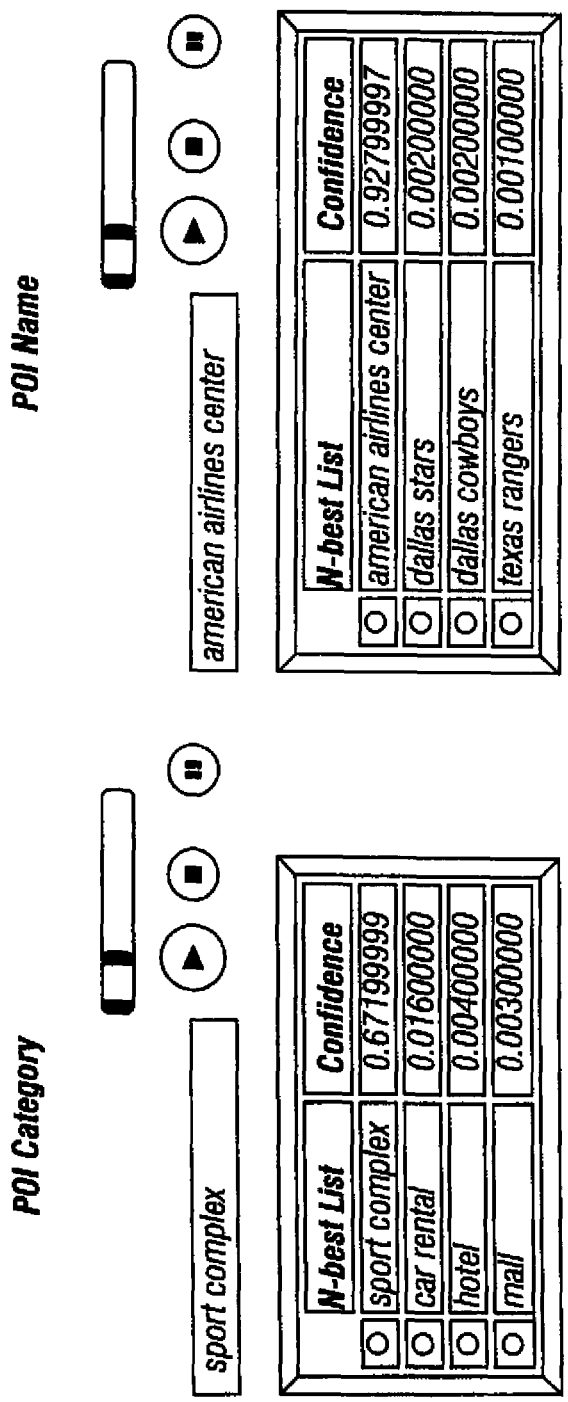
FIG. 2 is a conceptual diagram of a representative data center display suitable for implementing data center operator assistance in target destination recognition based on point of interest (POI) information.

FIG. 2 represents a sample screen shot from the live operator station 22 that is designed to assist the response center operator 23, at block 115 of procedure 100, in determining a target destination. The example shown is for a specific POI, including the corresponding POI category. FIG. 2 illustrates two n-best lists, one for the POI category and one for the corresponding POI. The confidence scores are listed next to each recognition hypothesis shown in the n-best lists, and serve to indicate the relative likelihood that the phrase that was spoken is what is listed. For the hypothesis "sport complex," the confidence score shown is 0.67199999, which is significantly better than the confidence score for the next best choice, 0.01600000 (the hypothesized spoken phrase, "car rental"). The upper two boxes contain text that matches the first choices from the n-best lists. The text contained within the two boxes can be modified by the response center operator either by character 10 by-character entry from a keyboard, or by selecting an n-best entry, also by using a mouse (or keyboard). To the right of each box are audio controls (radio buttons) that allow the stored audio wave files to be played and listened to by the response center operator 23.

The ability of the data center operator to play the audio wave file representations of the spoken destination components is critical to the overall process. For the example under consideration, there are two destination components: the POI category and the POI name. If a phrase other than the top choice is selected from either n-best list, then the text in the corresponding upper box changes automatically. In the example shown, if a different POI category is chosen by the response center operator 23, then a different subsequent grammar can be activated; the n-best list for the POI changes and a new top choice is automatically entered into the upper box for the POI name. The confidence scores for the new n-best list will be quite different and would be expected to be significantly higher if the stored audio wave file matches a grammar entry well. For the example described here, the vehicle operator says a POI category. The category is recognized, and the vehicle operator is asked if the nearest "sport complex" is the desired destination. A positive response completes the destination entry on the user interface side because the GPS information for the vehicle position is all that is needed to determine the route at block 113 of procedure 100. The GPS is used as the starting point, and the nearest POI is determined based on category screening and distance.

FIG. 3 represents part of sample screen shot from the live operator station 22 that is designed to assist the response center operator 23, at block 115 of procedure 100, in determining a target destination component. The example shown is for a specific city and state, and includes the n-best list generated by the voice recognition unit 20 for the city and state that was spoken by the vehicle operator 10. The confidence scores are listed next to each recognition hypothesis shown in the n-best list and serve to indicate the relative likelihood that the phrase that was spoken is what is listed. For the hypothesis "Dallas Tex.," the confidence score shown is 0.96799999, which is significantly better than the confidence score for the next best choice, 0.01899999 (the hypothesized spoken phrase, "Alice, Tex.").

Referring again to FIG. 3, the upper box contains text that matches the first choices from the n-best lists. The text contained within the box can be modified by the response center operator either by character-by-character entry from a keyboard, or by selecting an n-best entry by using a mouse. To the right of the upper box are audio controls that allow the stored audio wave files to be played and listened to by the response center operator 23. Again, the ability to play the audio wave file representations of the spoken destination components is critical to the overall process. If a phrase other than the top choice is selected from the n-best list, then the text in the corresponding upper box changes automatically. The audio wave file represents speech provided by the vehicle operator 10 (in this case, a city and state).

FIG. 4 represents another screen shot from the live operator station 22 that is designed to assist the response center operator 23 in determining a target destination. The example shown is for a specific city, state, and street name. FIG. 4 illustrates two n-best lists, one for the city and state and one for the street name. The confidence scores are listed next to each recognition hypothesis shown in the n-best lists and serve to indicate the relative likelihood that the phrase that was spoken is what is listed. For the hypothesis "Winchester, Calif.," the confidence score shown is 0.18600000, which is not significantly better than the confidence score for the next best choice, 0.14499999 (the hypothesized spoken phrase, "Westchester, Calif."). Referring to FIG. 4, the upper two boxes contain text that matches the first choices from the two n-best lists. The text contained within the two boxes can be modified by the response center operator either by character-by-character entry from a keyboard, or by selecting an n-best entry, by using a mouse (or other means). To the right of each box are audio controls that allow the stored audio wave files to be played and listened to by the response center operator 23.

Figure 5:
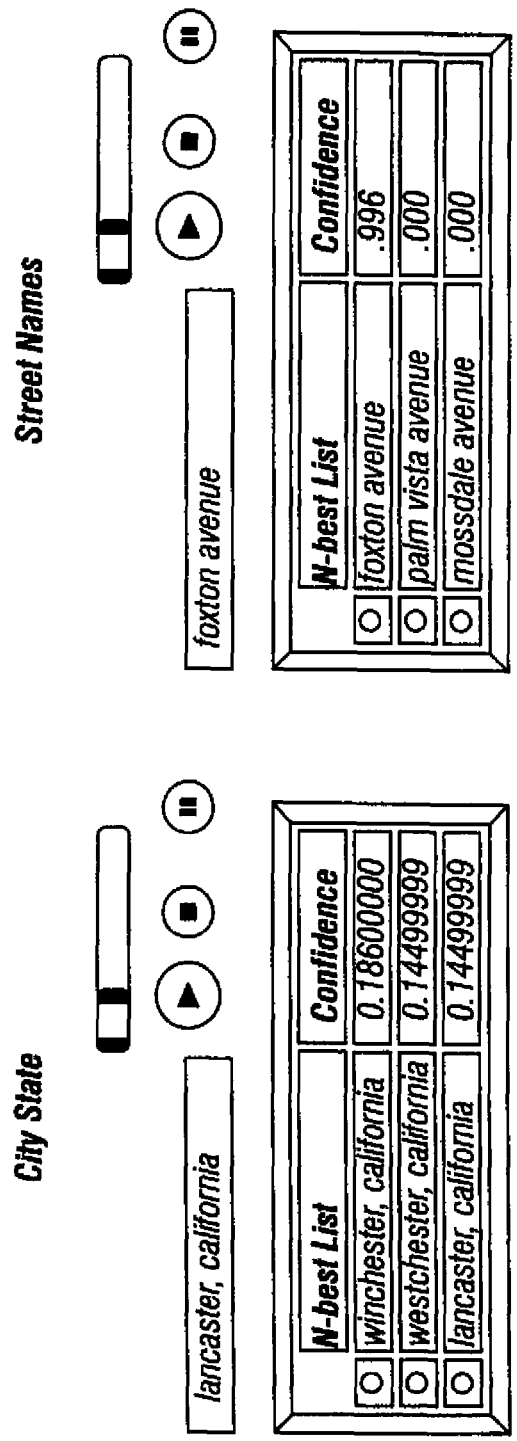

The ability to play the audio wave file representations of the spoken destination components is critical to the overall process. For the example under consideration, there are two destination components: the city/state and the street name. If a hypothesis other than the top choice is selected from either n-best list, then the text in the corresponding upper box changes automatically. In the example shown, if a different city/state is chosen by the response center operator 23, then a different subsequent grammar is activated; the n-best list for the street name changes and a new top choice is automatically entered into the upper box for the street name. FIG. 5 illustrates the result that occurs when "Lancaster, Calif." is chosen by the response center operator 23. The confidence scores for the new n-best list of street names are quite different, and the top choice street has a high confidence score, 0.996, which is close to being a perfect match. Note that the response center operator's 23 task for the example described here is: 1) listen to the city/state audio wave file, 2) select the correct city/state, 3) listen to the street name audio wave file to confirm that it is correct, 4) listen to the street number audio wave file to confirm that it is correct (not illustrated in and make any typed corrections if needed before final submission for navigation-related processing.

The level of captured audio wave files can be normalized by applying digital automatic gain control to improve human intelligibility and user interface consistency during audio play back of destination components. The captured audio can serve to indicate the quality of the network conditions to the vehicle operator. The captured audio teaches the vehicle operator how to speak into the microphone to achieve optimal recognition.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of providing navigational information, which comprises:
   receiving at a mobile processing system a continuous voice stream spoken by a user of the mobile processing system, the continuous voice stream including a complete destination address being an entirety of at least one of:
      a target destination point of interest;
      a street intersection; and
      an address set including at least a street number and a street name;
   processing the continuous voice stream into voice navigation information;
   transmitting the processed voice navigation information via a wireless link to a remote data center;
   analyzing the processed voice navigation information with a computerized voice recognition system at the remote data center to recognize components of the complete destination address spoken by the mobile system user;
   computer-generating at the remote data center a list of hypothetical recognized components of the complete destination address listed by confidence levels as computer-calculated for each component of the complete destination address analyzed by the voice recognition system;
   computer-generating a display of the computer-generated list of hypothetical recognized components and confidence levels at the remote data center for selective checking by a human data center operator;
   selecting a set of hypothetical recognized components based on the confidence levels in the list;
   confirming the accuracy of the selected set of hypothetical recognized components of the complete destination address via computer-generated interactive exchanges between the mobile system user and the remote data center; and
   determining a destination from confirmed components of the complete destination address.

2. The method according to claim 1, which further comprises carrying out the accuracy confirming step by:
   transmitting a computer-generated representation of at least one hypothetical recognized component of the complete destination address to the mobile system user via the wireless link; and
   prompting the mobile system user via the wireless link to aurally confirm the accuracy of the component of the complete destination address.

3. The method according to claim 2, which further comprises carrying out the accuracy confirming step by:
   determining if a confidence level of a hypothetical recognized component is above a selected threshold; and
   computer generating a representation of the hypothetical recognized component for transmission to the mobile system user when the confidence level is above the selected threshold.

4. The method according to claim 1, which further comprises carrying out the accuracy confirming step by:
   transmitting at least one recorded hypothetical recognized component of the complete destination address spoken by the mobile system user to the mobile system user via the wireless link; and prompting the mobile system user via the wireless link to aurally confirm the accuracy of the hypothetical recognized component of the complete destination address.

5. The method according to claim 1, which further comprises carrying out the destination determining step by providing human data center operator assistance using the developed list of hypothetical recognized components and confidence levels to recognize the complete destination address.

6. The method according to claim 5, which further comprises carrying out the operator assistance providing step by:
 playing back recorded representations of the complete destination address spoken by the mobile system user to the data center operator for analysis by the data center operator; and
 receiving information from the data center operator identifying the destination.

7. The method according to claim 6, which further comprises carrying out the data center operator information receiving step by entering a choice from the displayed list of hypothetical recognized components from the data center operator.

8. The method according to claim 1, which further comprises carrying out the accuracy confirming step by transmitting aural representations of hypothetical recognized components of the complete destination address to the mobile system user, the hypothetical recognized components of the complete destination address being selected from aural representations of portions of the complete destination from the group consisting address number, street name, city, state, and point of interest.

9. A system for providing navigational information, comprising:
 a mobile system processing and transmitting via a wireless link a continuous voice stream spoken by a user of the mobile system, the continuous voice stream including a complete destination address; and
 a data center processing the continuous voice stream received via the wireless link into voice navigational information and operates to:
  perform automated voice recognition processing on the voice navigational information to recognize destination components of the complete destination address;
  confirm the recognized destination components through interactive speech exchanges with the mobile system user via the wireless link and the mobile system;
  selectively allow human data center operator intervention to assist in identifying the selected recognized destination components having a recognition confidence below a selected threshold value; and
  download the complete destination address for transmission to the mobile system derived from the confirmed recognized destination components.

10. The system according to claim 9, wherein the data center further operates to download the navigational information in response to position information received from the mobile system via the wireless link.

11. The system according to claim 9, wherein the data center further operates to:
 generate a list of possible destination components corresponding to the continuous voice stream;
 assign a confidence score for each of the possible destination components on the list;
 determine if a possible destination component with a highest confidence score has a confidence score above a threshold; and
 computer-generate an aural representation of the destination address for transmission to the mobile system for confirmation by the mobile system user if the confidence score is above the threshold.

12. The system according to claim 9, wherein the data center further operates to:
 determine that at least one of the destination components of the continuous voice stream has a recognition confidence value below a threshold; and
 playback a recording in the voice of the mobile system user of at least the at least one destination component with the recognition confidence value below the threshold to the mobile system user via the mobile system for confirmation.

13. The system according to claim 12, wherein the data center further comprises a data center operator facility playing back the destination components for assisting in identifying the complete destination address.

14. The system according to claim 12, wherein the data center further operates to present a list of possible destinations listed by confidence scores to the data center operator for selection as the complete destination address.

15. The system according to claim 14, wherein the data center further operates to allow the data center operator to vary an order of the possible destinations in the list.

16. The system according to claim 9, wherein the continuous voice stream comprises a spoken request for point of interest information.

17. The system according to claim 16, wherein the point of interest information includes information selected from the group consisting of names and categories.

18. The system according to claim 9, wherein the destination components of the continuous voice stream comprise location information selected from at least one of the group consisting of information identifying state, city, street name, and address number.

19. The system according to claim 9, wherein the data center further operates to record the continuous voice stream spoken by the user as normalized audio wave fields for subsequent playback.

20. A method of providing navigational information, which comprises:
 receiving at a mobile processing system a continuous voice stream spoken by a user of the mobile processing system, the continuous voice stream including a complete destination address being an entirety of at least one of:
  a target destination point of interest;
  a street intersection; and
  an address set including at least a street number and a street name;
 processing the continuous voice stream into voice navigation information;
 transmitting the processed voice navigation information via a wireless link to a remote data center;
 analyzing the processed voice navigation information with a computerized voice recognition system at the remote data center to recognize components of the complete destination address spoken by the mobile system user;
 computer-generating at the remote data center a list of hypothetical recognized components of the complete destination address listed by confidence levels as computer-calculated for each component of the complete destination address analyzed by the voice recognition system;
 computer-generating a display the computer-generated list of hypothetical recognized components and confidence levels at the remote data center;

selecting a set of hypothetical recognized components based on the confidence levels in the list;

confirming the accuracy of the selected set of hypothetical recognized components of the complete destination address via computer-generated interactive exchanges between the mobile system user and the remote data center; and determining a destination from confirmed components of the complete destination address.

* * * * *